(12) United States Patent
Schuster et al.

(10) Patent No.: US 6,554,332 B1
(45) Date of Patent: Apr. 29, 2003

(54) PEDESTRIAN IMPACT ENERGY MANAGEMENT DEVICE WITH SEESAW ELEMENTS

(75) Inventors: Peter John Schuster, Dearborn, MI (US); Liz Tait, Colchester (GB); Bradley Staines, Benfleet Essex (GB); Christopher William Lucas, Black Notley (GB); Edward Nathan Sickafus, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,791

(22) Filed: Nov. 19, 2002

(51) Int. Cl.[7] ............................................. B60R 19/02
(52) U.S. Cl. ....................................... 293/102; 293/120
(58) Field of Search ................................ 293/102, 109, 293/120

(56) References Cited

U.S. PATENT DOCUMENTS

| | | | |
|---|---|---|---|
| 1,360,369 A | * | 11/1920 | Cohen |
| 3,506,295 A | | 4/1970 | Yancey |
| 3,843,182 A | | 10/1974 | Walls et al. |
| 3,884,516 A | | 5/1975 | Gallion et al. |
| 4,105,236 A | | 8/1978 | Haar |
| 5,425,561 A | | 6/1995 | Morgan |
| 5,823,587 A | * | 10/1998 | Kim ..................... 293/102 X |
| 5,934,743 A | | 8/1999 | Nohr et al. |
| 6,290,272 B1 | | 9/2001 | Braun |

* cited by examiner

Primary Examiner—Joseph D. Pape
(74) Attorney, Agent, or Firm—Gary A. Smith

(57) ABSTRACT

A pedestrian safety device for mounting to an automotive vehicle has a relatively low-resistance mechanical response when struck by an object having the approximate width of a human leg, and relatively high-resistance response when struck by an object wider than a human leg. The impact energy management device comprises a backplate attachable the vehicle and a plurality of seesaw elements attached to the backplate for pivoting movement relative to the backplate. Each element has a first and a second contact end spaced forwardly from the beam. When a narrow object like a pedestrian's leg strikes the device, only one end of each seesaw element is urged toward the backplate and the element pivots with respect to the backplate to absorb energy and offer a relatively low resistance. When a wider object strikes the device, both contact ends of a seesaw element are engaged so that the element bends toward the backplate. The strain caused by the bending offering a higher resistance to intrusion by the object.

20 Claims, 7 Drawing Sheets

PEDESTRIAN IMPACT ENERGY MANAGEMENT DEVICE WITH SEESAW ELEMENTS

BACKGROUND OF INVENTION

1. Field of the Invention

The present invention relates generally to devices for reducing the severity of injury to a pedestrian struck by an automotive vehicle, and more particularly to an impact energy management device for mounting to the front bumper of a vehicle that exhibits a relatively soft response to a localized impact from a pedestrian's leg, and a relatively stiff response to a broad impact from another vehicle.

2. Background

It is desirable for a front bumper of a vehicle to be designed so that a collision of the vehicle with a pedestrian will result is as little injury to the pedestrian as is practical. The objective of minimizing pedestrian injury is complicated, however, by the requirement that the front bumper and related vehicle structure be able to protect vehicle occupants during a high-energy impact with another vehicle or a fixed object by effectively absorbing impact energy. The bumper must also be resistant to damage during a low-energy collision in order to reduce repair costs. Packaging constraints driven by styling and other factors may also affect the ways in which these three objectives may be met.

The most common way to address these conflicting requirements has been to provide a relatively stiff bumper beam designed to manage a high-energy (vehicle-to-vehicle or vehicle-to-barrier) impact, and position a relatively soft material or structure in front of the bumper beam. The soft material or structure deforms in a pedestrian impact to provide injury-reducing cushioning, but typically contributes only a negligible amount of energy absorption during a high-energy collision. One disadvantage to this conventional solution is that the vehicle front-end must be longer in order to package these systems in series.

SUMMARY OF INVENTION

The present invention provides an energy absorbing device for pedestrian safety that has a first, relatively low-resistance mechanical response when struck by an object having the approximate width of a human leg, and a second, relatively high-resistance response when struck by an object wider than a human leg. The device is primarily intended to be mounted to the front bumper beam of a vehicle, but may be mounted on any exterior surface that may contact a pedestrian during a collision.

According to the invention, the impact energy management device comprises a backplate attachable to an exterior of the vehicle and a plurality of seesaw elements, each seesaw element attached to the backplate at a pivot point for pivoting movement relative to the backplate and having first and second contact ends spaced from the beam. When only one end of a seesaw element is urged toward the backplate by a collision with a pedestrian's leg, the seesaw element pivots with respect to the backplate. The pivot point is designed to absorb energy as the pivoting action takes place and offer a relatively low resistance to intrusion of the leg toward the backplate as it does so. When a wider object strikes the device, both contact ends of a seesaw element are engaged so that the element bends toward the backplate. The strain caused by the bending offers a higher resistance to intrusion by the object.

According to another feature of the invention, the seesaw elements are arranged in at least two generally horizontal rows, and adjacent rows are offset from one another in a horizontal direction such that the contact ends of seesaw element adjacent rows are not in vertical alignment with one another. This configuration ensures that a pedestrian leg will be engaged by the contact end of at least one element no matter where on the device the leg strikes.

According to the preferred embodiment of the invention disclosed herein, at least one of the seesaw elements is shaped like a V, with the pivot point located at a vertex of the V and the contact ends located at opposite ends of the V. The first and second contact ends are separated from one another by a horizontal distance somewhat greater than the expected width of a pedestrian leg. This ensures that in a collision with a pedestrian leg, the leg will only engage one of the contact ends of any of the seesaw elements so that the desired pivoting movement occurs.

Other features and advantages of the present invention will be readily appreciated and better understood after reading the subsequent description when considered in connection with the accompanying drawings.

DETAILED DESCRIPTION

Figure 1:
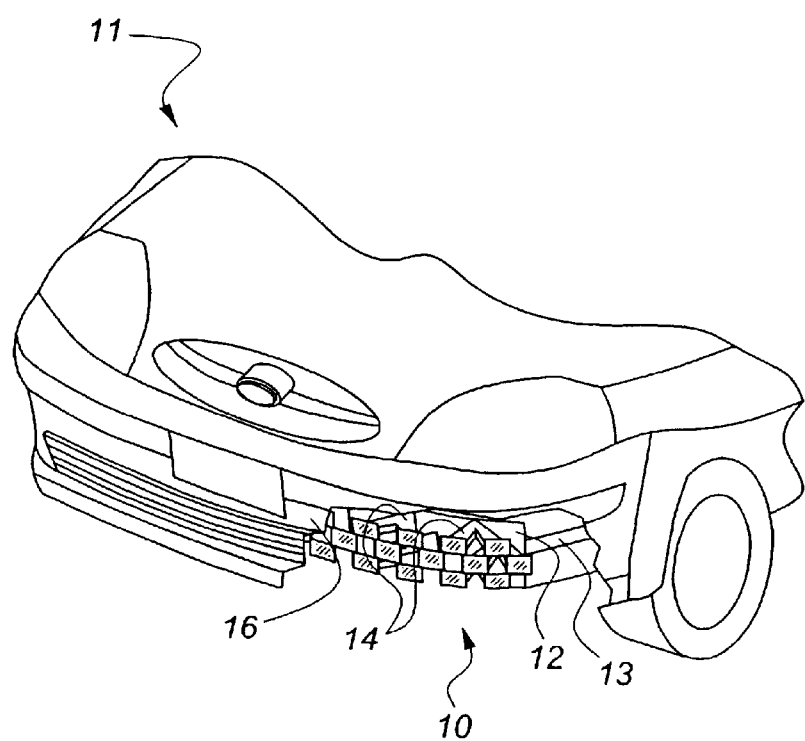
FIG. 1 is a perspective view of the front portion of an automotive vehicle with an energy-absorbing device according to invention.

An impact energy management device 10 according to the present invention is shown in FIG. 1 mounted to the front bumper beam 13 of a vehicle 11. While the device can be mounted on any exterior surface of a vehicle, its normal application is on the front of the vehicle.

Figure 2:
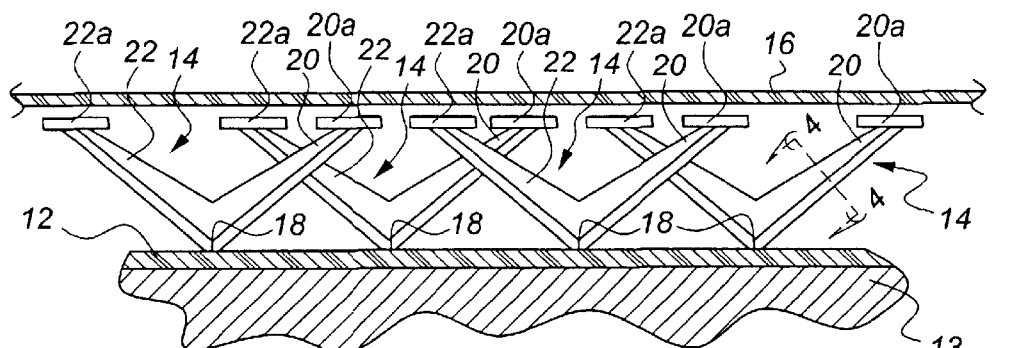
FIG. 2 is a top view of the invention device.
Figure 3:
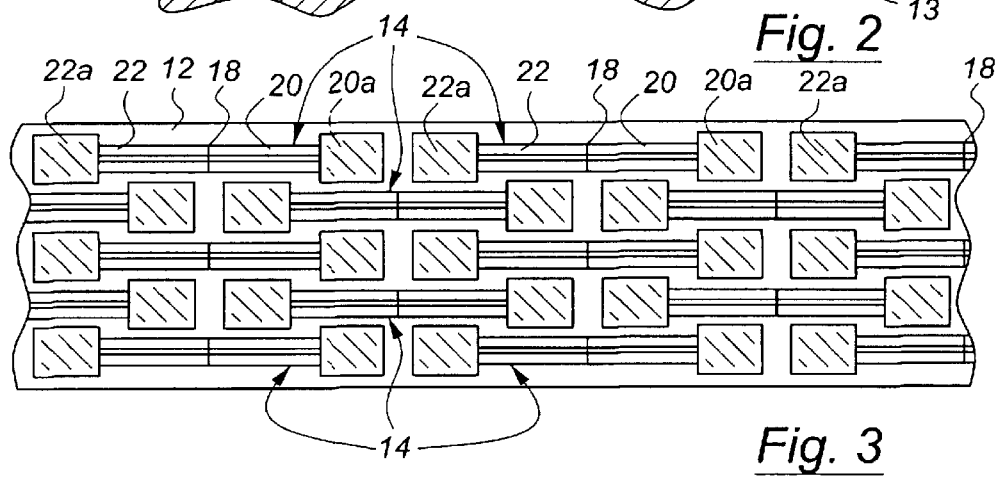
FIG. 3 is an elevation view of the invention device.

As seen in FIGS. 2–3, the invention comprises a backplate 12 that is preferably attached to the bumper beam 13 or some other rigid structural component of the vehicle. A plurality of seesaw elements 14 are attached to the forward-facing surface of the backplate 12 in multiple, generally horizontal rows. A fascia 16 covers the device and is preferably made of relatively thin and easily deformable plastic material. Although FIGS. 2 and 3 show a section of the backplate 12 that is flat, the backplate 12 may be curved, angled, or otherwise non-planar as necessary to cover the desired portion of the vehicle structure. For example, the backplate 12 may be curved to wrap around the left and right corners of a curved bumper beam 13, as shown in FIG. 1.

Each seesaw element 14 is attached to the backplate 12 at a pivot point 18 and is composed of a first arm 20 and a second arm 22 projecting laterally outwardly from the pivot point 18 and forwardly from the backplate 12. The arms 20,22 terminate in contact ends 20a,22a that may be flattened to form pads that are preferably generally parallel with the inner surface of the fascia 16. The seesaw elements 14 may be molded integrally with the backplate 12, the pivot point 18 being formed by a "living hinge" where the cross-sectional area at the junction between the seesaw element 14 and the backplate 12 is reduced to allow the seesaw element to bend about the pivot point 18 if a load is applied to one or the other of the contact ends 20a,22a.

In the preferred embodiment, the seesaw elements 14 are arranged on the backplate 12 in two or more generally horizontal rows, and elements in adjacent rows are staggered from one another in a lateral or horizontal direction. See FIG. 3.

Figure 4:
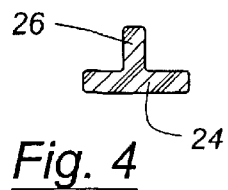
FIG. 4 is a cross-sectional view taken along line 4—4 of FIG. 2.

As best seen in FIG. 4, each arm of a seesaw element 14 has a generally T-shaped cross-section comprising a flange 24 and a web 26. The web 26 may vary in depth and/or thickness, and preferably increases in depth closer to the joint. The entire seesaw element 14 may be formed of a single material, or it may be of composite design having the web 26, flange 24, and/or contact pad made of different materials in order to tune the physical properties of the element. This may be accomplished, for example, by a co-molding manufacturing process in which different types of polymeric material are injected sequentially into a mold, as is well known in the molding arts. All of the seesaw elements 14 need not have identical physical properties, but rather may be of varying geometries and/or strengths in order to produce the desired degree and rate of energy absorption.

Figure 5:
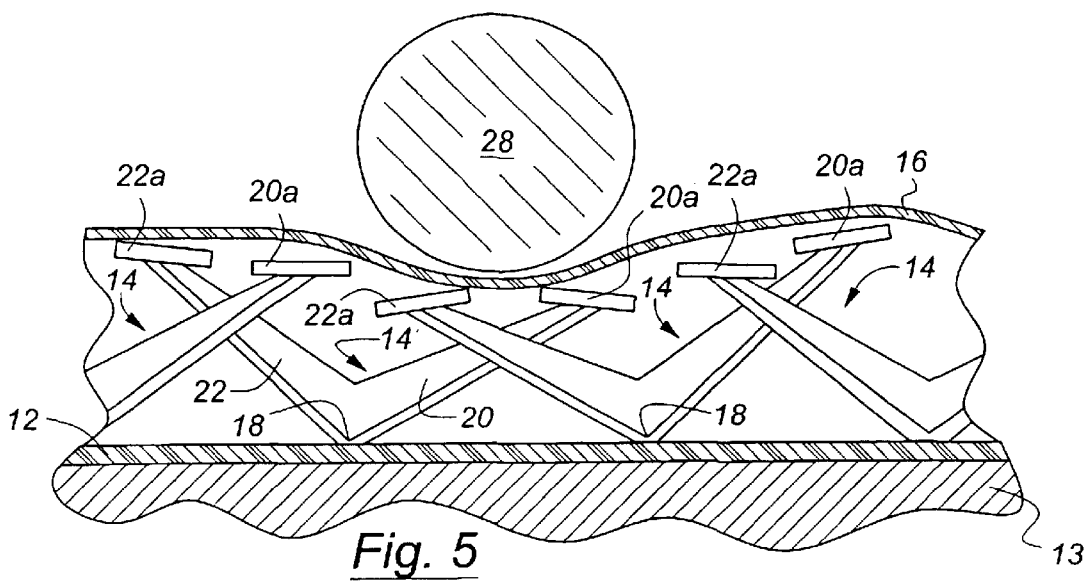
FIG. 5 is a top view of the invention device just after impact with a pedestrian's leg.
Figure 6:
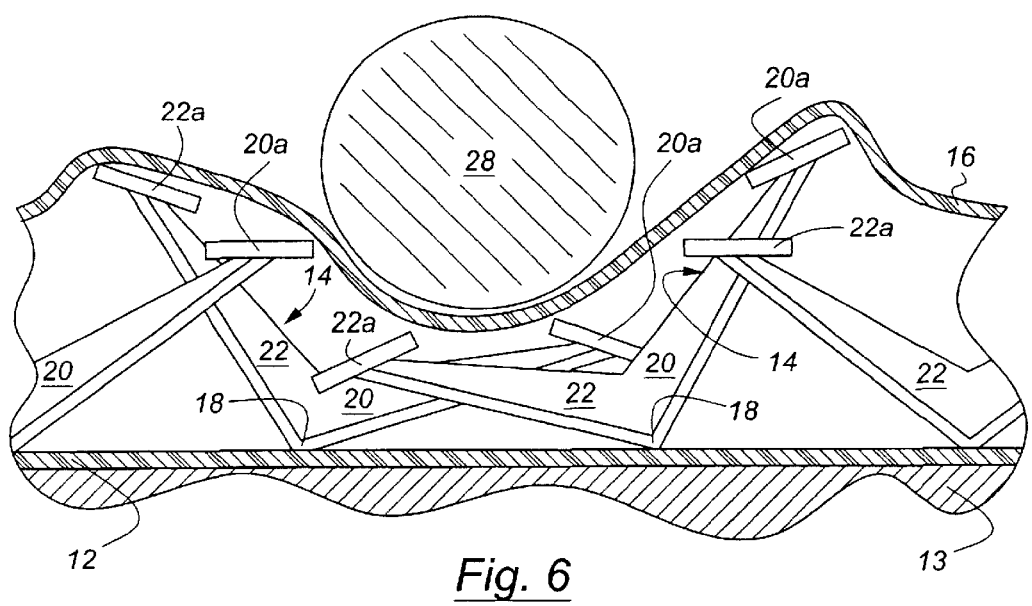
FIG. 6 is a top view of the invention device after the pedestrian's leg has intruded into the device.

FIGS. 5 and 6 depict the response of the invention energy absorption device during a collision with a pedestrian's leg 28. On most passenger vehicles the bumper is at such a height that in a collision with a pedestrian the vehicle makes initial contact with one or both of the pedestrian's legs. The contact ends 20a,22a of each seesaw element 14 are spaced from one another by a distance determined by the expected width of the leg 28. For example, the contact ends 20a,22a of each element 14 are preferably spaced by a distance somewhat greater than the expected width of leg 28 so that the leg will engage only one contact end of any seesaw element 14. This is assuming that the leg remains generally vertical, or perpendicular to the plane containing the two contact ends 20a,22a.

Depending upon the number, size, arrangement, and spacing of the seesaw elements 14, and the exact position on the device 10 where the leg 28 impacts, more than one seesaw elements 14 will be engaged by the leg impact in a manner to actively resist intrusion of the leg 28. In the example shown in FIG. 5, the leg 28 strikes the device at a location where it bears against the contact ends 20a',22a" of two seesaw elements 14',14" in separate rows that are vertically spaced from one another, and the contact ends of which overlap one another horizontally. This results in both of the seesaw elements 14 being engaged. When the collision occurs, the leg 28 presses the contact ends 20a',22a" of seesaw elements 14',14" rearward toward the bumper, causing the engaged seesaw elements to rotate about their respective pivot points 18. This rotation provides a relatively small amount of resistance to intrusion of the leg 28 toward the backplate 12. The precise amount of resistance provided by each seesaw element 14 may be tailored by proper design of the connection between the seesaw element 14 and the backplate 12 at the pivot point 18, as will be apparent to those of skill in the mechanical and materials arts. For example, the pivot point 18 may be designed to provide a progressively increasing amount of resistance as the seesaw element 14 rotates farther from its original position (see FIG. 6).

Depending on the number of horizontal rows of seesaw elements 14 and the amount of horizontal offset between elements in the rows, the leg 28 will engage the contact ends 20a,22a of one or more elements in each of several rows, thereby increasing the total amount of energy absorption. The amount and rate of energy absorption provided by each seesaw element 14 are tuned to take into account the fact that multiple elements 14 will be engaged in most pedestrian collisions.

Impact energy is also absorbed by virtue of the contact ends 20a",22a' outboard from the leg 28 (the ends opposite those which are pushed rearward) pushing outward on and deforming the fascia 16 as the seesaw element 14 pivots. See FIG. 6.

Figure 7:
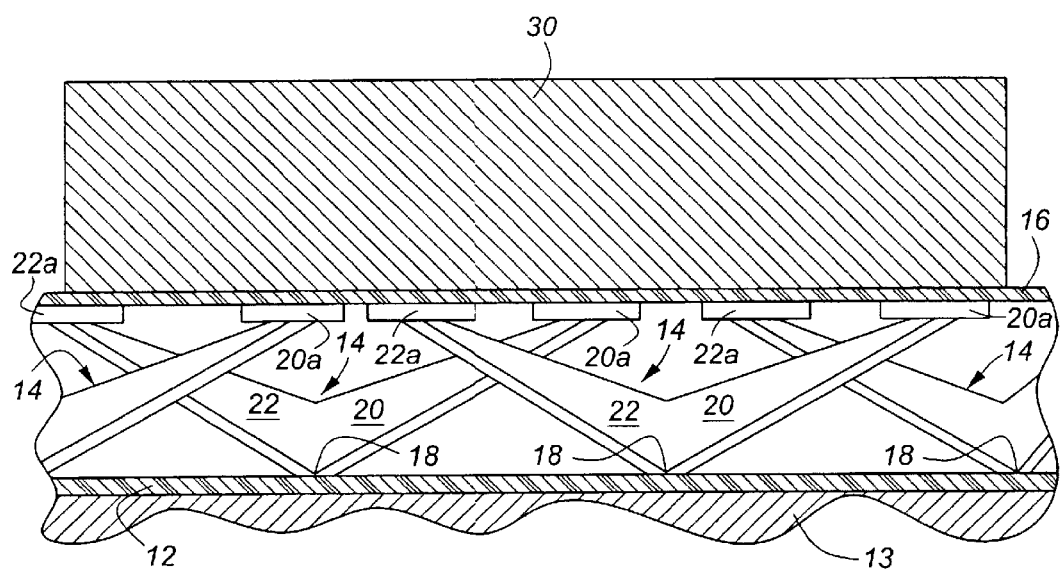
FIG. 7 is a top view of the invention device just after impact with a wide object.
Figure 8:
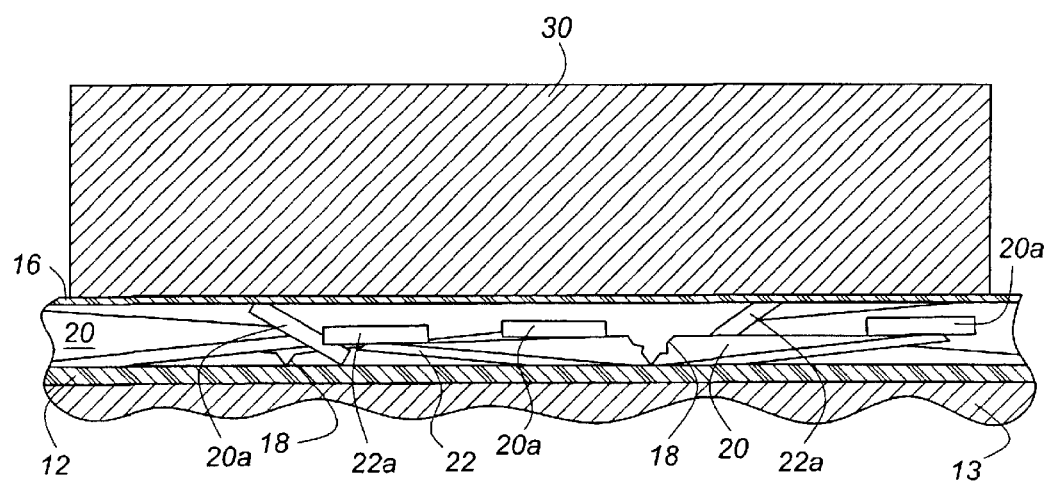
FIG. 8 is a top view of the invention device after the wide object has intruded into the device.

FIGS. 7 and 8 depict the response of the invention energy absorption device during a collision with an object 30 that is significantly wider than a human leg 28, such as another vehicle or a fixed barrier. As seen in FIG. 7., the object 30 makes contact with the fascia 16 over a broad area that spans both contact ends 20a,22a of at least one, but preferably many, of the seesaw elements 14. Just as in the case of a pedestrian collision, the number of engaged seesaw elements 14 depends on the number, size, arrangement, and spacing of the seesaw elements 14.

When both contact ends 20a,22a of any one seesaw element 14 are engaged and urged rearward by the collision with the object 30, the element 14 is flattened toward the backplate 12 so that the arms 20,22 of each engaged element 14 are forced to spread apart or separate. This causes bending-induced strain in the seesaw element 14, most significantly in the area where the arms 20,22 meet one another adjacent the pivot point 18. This strain produces a much higher resistance to intrusion of the object 30 toward the backplate 12 than is created by rotation of the seesaw elements 14 as in the leg-impact case.

Seesaw elements 14 that are adjacent the boundaries of the object 30 may be engaged only on one contact end so that they rotate in a manner similar to that described above in relation to the leg 28 impact case.

The amount and rate of impact energy absorbed by the device in the collision depends, among other factors, on the number of seesaw elements 14 engaged by the object 30 and the design of the elements 14. In the depicted embodiment, the web 26 located between the flanges 24 of the arms 20,22 is formed of a material that is able to absorb a relatively large amount of energy as it deforms. The material forming the seesaw elements 14 may also be sufficiently elastic for the elements to return to their original shapes after some collisions. As seen in FIG. 8, in a severe impact the web 26 and/or other portions of the seesaw element 14 will fracture, tear, or otherwise plastically strain as the element 14 collapses fully against the backplate 12.

The invention device is preferably mounted to a bumper beam 13 or other part of the vehicle structure that is designed to manage impact energy in the event that the collision is so severe that the invention device cannot absorb all of the impact energy.

Figure 9:
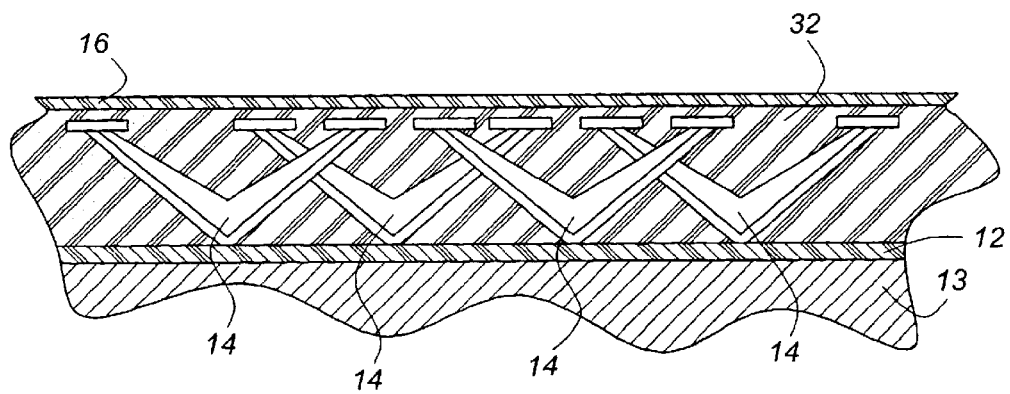
FIG. 9 is a top view of a second embodiment of the invention device with the seesaw elements surrounded by a matrix of energy absorbing material.

In a second embodiment of the invention shown in FIG. 9, the seesaw elements 14 are encased in a matrix 32 of foam or other deformable material. The matrix 32 increases the amount of energy that is absorbed by the invention device during a collision, and may also make the device more durable and able to return to its original shape after a collision.

The seesaw elements are not limited to the V-shape described and depicted herein, but may be of any shape that provides two contact ends disposed forward of the backplate and a pivot point located such that the element rotates about the pivot point when one contact end is loaded, and deforms to absorb energy when both contact ends are loaded simultaneously.

While the best modes for carrying out the invention have been described in detail, those familiar with the art to which this invention relates will recognize various alternative designs and embodiments for practicing the invention as defined by the appended claims.

What is claimed is:

1. An impact energy management device for a vehicle comprising:
    a backplate attachable to an exterior of the vehicle; and
    a plurality of seesaw elements, each seesaw element attached to the backplate at a pivot point for pivoting movement relative to the backplate and having a first contact end and a second contact end spaced from the backplate.

2. The apparatus according to claim 1 wherein at least one of the seesaw elements is in the shape of a V, the pivot point located at a vertex of the V and the contact ends located at ends of the V.

3. The apparatus according to claim 1 wherein the first and second contact ends lie in a horizontal plane when the device is mounted to a vehicle.

4. The apparatus according to claim 1 wherein the contact ends of at least one of the seesaw elements are spaced by a lateral distance determined by an expected pedestrian leg width.

5. The apparatus according to claim 4 wherein the lateral distance is greater than the expected pedestrian leg width.

6. The apparatus according to claim 1 wherein at least one seesaw element comprises a first arm extending between the pivot point and the first contact end, a second arm extending between the pivot point and the second contact end, and a web connecting the first and second arms along at least part of respective lengths of the first and second arms, the web being of a predetermined strength that allows the web to strain and the first and second arms to move away from one another when the first and second contact ends are subjected to a predetermined force directed toward the backplate.

7. The apparatus according to claim 1 wherein the seesaw elements are arranged in at least two generally horizontal rows.

8. The apparatus according to claim 7 wherein a first and a second of the at least two rows of seesaw elements are offset from one another in a horizontal direction such that a contact end of a first element in an upper of the two rows is not in vertical alignment with a contact end of a second element in a lower of the two rows.

9. The apparatus according to claim 1 wherein the seesaw elements are formed of a polymer.

10. The apparatus according to claim 1 wherein at least one of the seesaw elements is formed integrally with the backplate.

11. The apparatus according to claim 1 further comprising a matrix surrounding at least one of the seesaw elements.

12. The apparatus according to claim 1 wherein the backplate is adapted for mounting to a laterally extending front bumper of the vehicle.

13. The apparatus according to claim 1 further comprising a fascia disposed sufficiently close to the contact ends that pivoting movement of one of the seesaw elements about the pivot point causes one of the contact ends of the one seesaw element to urge the fascia away from the backplate.

14. A vehicle having an impact energy management device, the device comprising:
    a backplate attached to a front bumper beam of the vehicle;
    a plurality of seesaw elements connected to the backplate, each seesaw element having a first arm and a second arm projecting from the backplate, the first and second arms joined to one another adjacent to the backplate and having respective contact ends distal from the pivot point and spaced from one another by a lateral distance determined by an expected pedestrian leg width, and each seesaw element attached to the backplate adjacent the pivot point and pivotable relative to the backplate; and
    a fascia disposed adjacent the contact ends and substantially covering the seesaw elements.

15. The apparatus according to claim 14 further comprising a matrix surrounding at least one of the seesaw elements.

16. The apparatus according to claim 14 wherein the fascia is disposed sufficiently close to the contact ends that pivoting movement of one of the seesaw elements about the pivot point causes one of the contact ends of the one seesaw element to urge the fascia away from the backplate.

17. The apparatus according to claim 14 wherein at least one of the seesaw elements further comprises a web disposed between and connecting the first and second arms along at least part of respective lengths of the first and second arms.

18. The apparatus according to claim 14 wherein the seesaw elements are arranged in at least two generally horizontal rows.

19. The apparatus according to claim 18 wherein a first and a second of the at least two rows of seesaw elements are offset from one another in a horizontal direction such that a contact end of a first element in an upper of the two rows is not in vertical alignment with a contact end of a second element in a lower of the two rows.

20. A vehicle having an impact energy management device, the device comprising:
    a backplate attachable to a front bumper beam of the vehicle;
    a plurality of seesaw elements connected to the backplate and arranged in at least two generally horizontal rows, each seesaw element having a first arm and a second arm projecting from the backplate, the first and second arms rigidly joined to one another at a pivot point adjacent the backplate and having respective contact ends distal from the pivot point and spaced from one another by a lateral distance greater than an expected pedestrian leg width, and each seesaw element attached to the backplate adjacent the pivot point and pivotable relative to the backplate; and
    a fascia disposed sufficiently close to the contact ends that pivoting movement of one of the seesaw elements about the pivot point causes one of the contact ends of the one seesaw element to urge the fascia away from the backplate.

* * * * *